US009902196B2

(12) United States Patent
Karník

(10) Patent No.: US 9,902,196 B2
(45) Date of Patent: Feb. 27, 2018

(54) ANTI SLIP DEVICE FOR AUTOMOBILE WHEELS WITH WHEEL DISC ARRANGED AT THE INNER SIDE LANE OF THE WHEEL

(71) Applicant: Petr Gross, Milotice (CZ)

(72) Inventor: Ladislav Karník, Havířov-Šumbark (CZ)

(73) Assignee: Petr Gross, Milotice (CZ)

( * ) Notice: Subject to any disclaimer, the term of this patent is extended or adjusted under 35 U.S.C. 154(b) by 0 days.

(21) Appl. No.: 15/071,500

(22) Filed: Mar. 16, 2016

(65) Prior Publication Data

US 2016/0272001 A1    Sep. 22, 2016

(30) Foreign Application Priority Data

Mar. 18, 2015  (CZ) ..................... 2015-192

(51) Int. Cl.
*B60B 15/26* (2006.01)
*B60C 27/04* (2006.01)
*B60B 19/02* (2006.01)

(52) U.S. Cl.
CPC ............ *B60B 15/266* (2013.01); *B60C 27/04* (2013.01); *B60C 27/045* (2013.01); *B60B 19/02* (2013.01)

(58) Field of Classification Search
CPC .. B60L 315/266; B60L 315/263; B60C 27/04; B60C 27/045; B60C 27/023; B60C 27/0238; B60B 15/266; B60B 15/263
See application file for complete search history.

(56) References Cited

U.S. PATENT DOCUMENTS

| | | | | |
|---|---|---|---|---|
| 2,818,301 A | * | 12/1957 | Hayden ................. | B60C 27/045 301/46 |
| 4,120,336 A | * | 10/1978 | Baskall ................. | B60C 27/045 152/216 |
| 4,603,916 A | * | 8/1986 | Granryd ................. | B60B 15/10 152/213 A |
| 4,735,248 A | * | 4/1988 | Cizaire ................. | B60C 27/10 152/213 A |

(Continued)

FOREIGN PATENT DOCUMENTS

| | | | | |
|---|---|---|---|---|
| DE | 202013102724 U1 | * | 8/2013 | ............. B60C 27/20 |
| FR | 2220392 A1 | * | 10/1974 | ............. B60B 15/14 |
| WO | WO 2004012949 A1 | * | 2/2004 | ........... B60C 27/045 |

*Primary Examiner* — Kip T Kotter
*Assistant Examiner* — Scott A Browne
(74) *Attorney, Agent, or Firm* — Michael J. Feigin, Esq.; Feigin and Fridman LLC

(57) ABSTRACT

The anti slip device for automobile wheels with wheel discs arranged at inner side plain of the wheel, load-bearing part of which is attachable to the wheel from the outside. The extensible body is placed slidingly in the direction parallel to the wheel axis on the load-bearing part. There are arms fulcrumed on the extensible body around axes parallel to the wheel axis. The arms are fitted, at their ends, with surfaces of engagement, which bear against the tire peripheral surface in the working position. The extensible body is placed on the load-bearing part in the guidance, which comprises at least two pipes, with one outer pipe placed slidingly on each of the pipes and attached to the extensible body. There are tensile springs arranged in the pipes, and these springs are attached by one end to the load bearing part, and by the other end to the extensible body.

8 Claims, 3 Drawing Sheets

(56) References Cited

U.S. PATENT DOCUMENTS 8,181,684 B2* 5/2012 Kahen .................... B60B 15/00
                                                    152/216
8,439,096 B2* 5/2013 Maltezos ................ B60B 15/22
                                                    152/216

* cited by examiner

ANTI SLIP DEVICE FOR AUTOMOBILE WHEELS WITH WHEEL DISC ARRANGED AT THE INNER SIDE LANE OF THE WHEEL

TECHNOLOGY FIELD

This invention relates to the field of anti slip devices, specifically it is an anti slip device for automobile wheels with wheel disk arranged at the inner side plane of the wheel.

EXISTING STATE-OF-THE ART

We are familiar with anti slip devices for automobile wheels, which are installed on the automobile wheel. Anti slip elements are predominantly made in the form of readjustable arms, which are fitted with surfaces of engagement. In case of need, these arms are put to working position, in which the surfaces of engagement bear against the peripheral surface of a tire. Arms are put to the work position either manually or by means of systems, which are mechanical, pneumatic, or electric. Mostly pneumatic control systems are used in commercial vehicles.

Well-known anti slip devices for wheels of commercial vehicles are with regard to wheel construction of a commercial vehicle complex, include a large number of moving parts, and are bulky. In addition, individual types of known solutions have different qualities, they differ in reliability, price, and actual usability.

Invention Substance

The purpose of the invention is to create an anti slip device for automobile wheels with wheel discs arranged at the inner side of the wheel, whereas such anti slip device would not protrude outside neither in the home, nor working position over the outer side plain of the wheel, would enable remote control, and would be simple and reliable both in terms of functionality and controllability.

The above stated purpose is achieved by the anti slip device for automobile wheels with wheel discs arranged at the inner side plane of the wheel, loading-bearing part of which is attachable from the outside on the wheel disc as per the invention, substance of which is grounded in the fact that there is an extensible body slidingly, in the direction parallel to the wheel axis, placed on the load-bearing part, and inside the extensible body there are arms fulcrumed around the axes parallel to the wheel axis, which are, at their ends, fitted with surfaces of engagement, which, in the working position, bear against the peripheral tire surface.

The anti slip device is placed on the load-bearing part in a guidance, which is favorably made up by at least two pipes attached to the load-bearing part, while there is one outer pipe slidingly placed on each of these pipes, and this outer pipe is attached to the extensible body.

In pipes attached to the load-bearing part, tensile springs are arranged and attached by one end to the load-bearing part, and by the other end to the extensible body.

The anti slip device is fitted with drive for movement of the extensible and for turning of arms with surfaces of engagement. The drive is pneumatic, and it comprises source of compressed air, bellows for shifting of the extensible body, pneumatic motors for turning of arms with surfaces of engagement, and control components. Control components are fitted with remote electronically operated regulation elements.

Arm are fulcrumed on bearers, which are radially-slidingly and sprung placed in the extensible body. This way, contact of the surfaces of engagement with the peripheral surface of the tire is achieved in the course of driving.

SUMMARY OF PICTURES ON DRAWINGS

One possible way of configuration of the anti slip device as per the invention is depicted on the attached drawings, where FIG. 1 represents the anti slip device, in an inclined view, in an assembled state before installation to a wheel;

Figure 1:
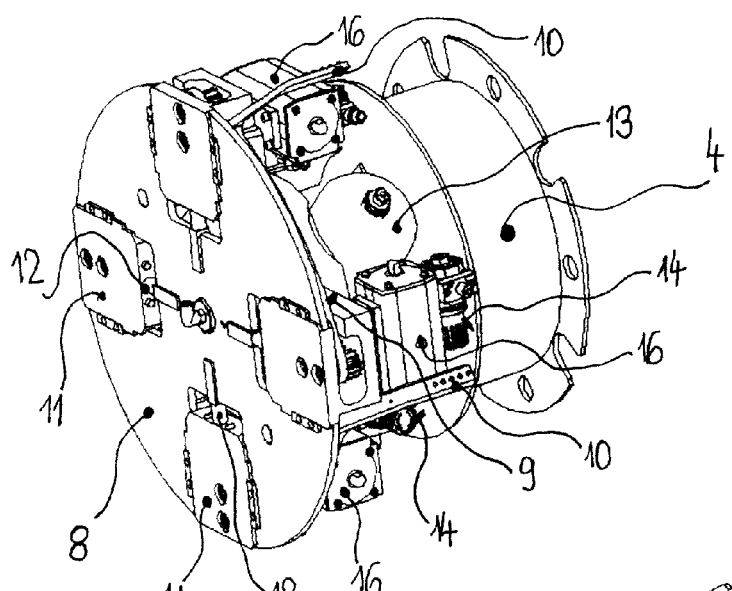
Figure 2:
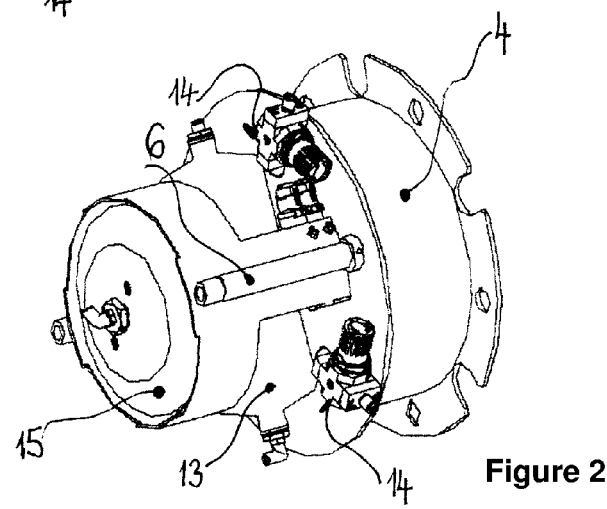
FIG. 2 represents the anti slip device as per the FIG. 1 excluding the extensible part.
Figure 3:
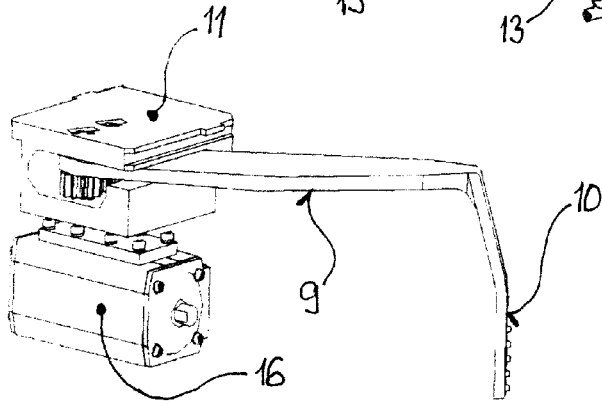
FIG. 3 represents one arm with the surface of engagement and drive for turning of the arm.
Figure 4:
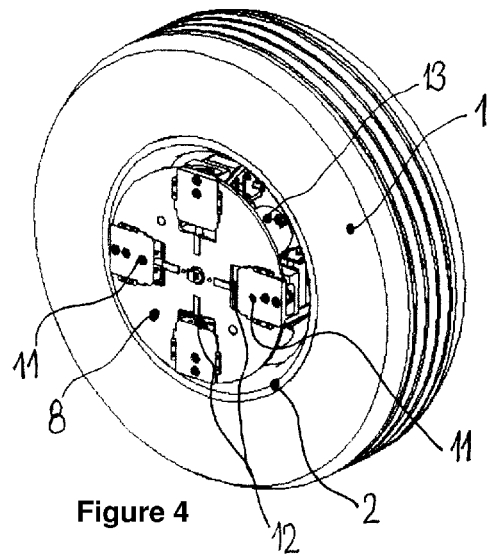
FIG. 4 represents the anti slip device mounted on a wheel, it is depicted in an inclined view.
Figure 5:
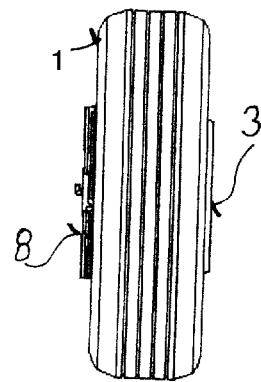
Figure 6:
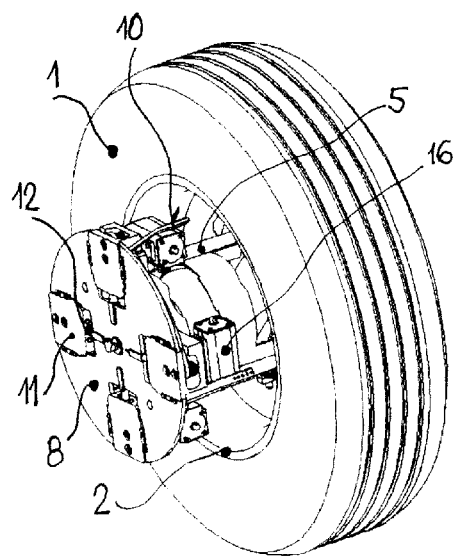
Figure 7:
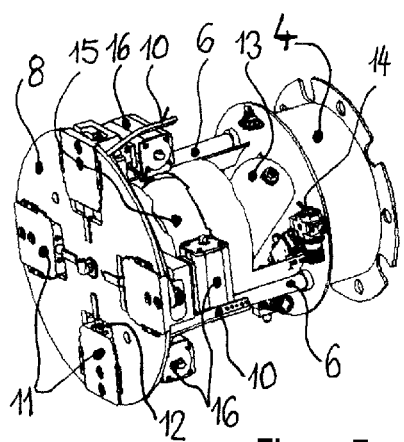
Figure 8:
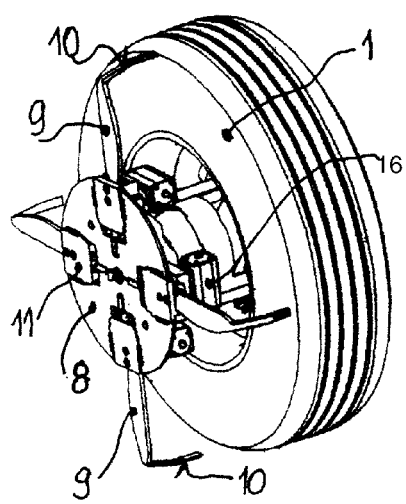
Figure 9:
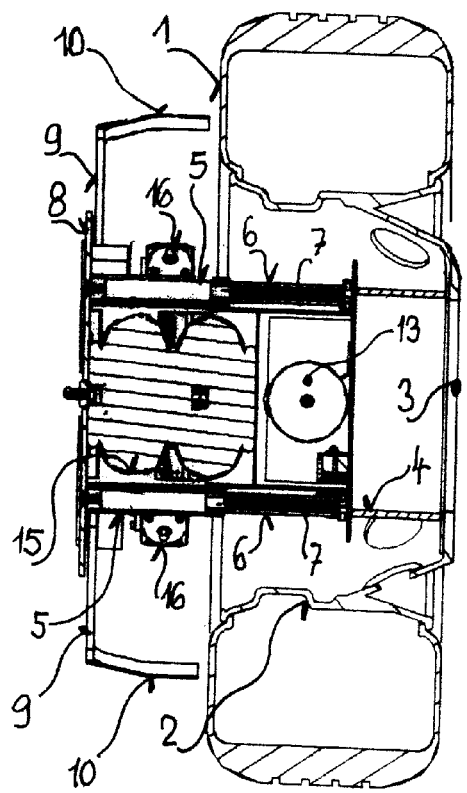
Figure 10:
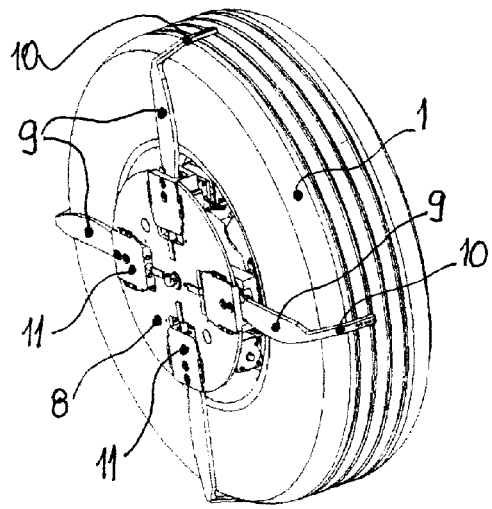
Figure 11:
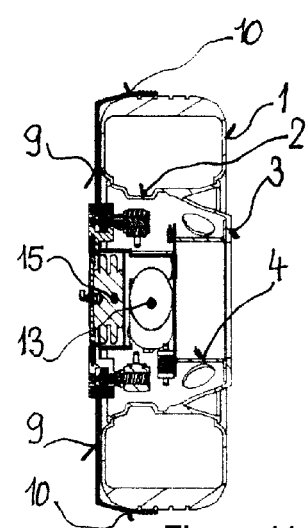

FIG. 5 wheel with installed anti slip device from the point of vehicle driving direction;

FIG. 6 depicts a wheel with the installed anti slip device, in an inclined view, in a slide out position;

FIG. 7 represents the anti slip device in a slide out position as per the FIG. 1 without a wheel;

FIG. 8 depicts an inclined view on the wheel with the anti slip device with partially turned arms;

FIG. 9 depicts a cross-section of a wheel with installed anti slip device in the position as per the FIG. 8;

FIG. 10 depicts a wheel with the anti slip device in the working condition in an inclined view; and finally FIG. 11 is a cross-section of a wheel with installed anti slip device in the position as per the FIG. 10.

EXAMPLE OF INVENTION CONFIGURATION

The anti slip device consists of a load-bearing part 4, which is assembled to the wheel disc 3 with tire 1 from the outer side by a regular method, e.g. by means of screws and nuts.

Disc 3 is placed closer to the inner side plane of the wheel, where it is connected to the rim 2. This way, the anti slip device practically does not protrude above the outer side plane of the wheel neither after it is mounted to the wheel, nor in the work position. This type of wheels can be found for example on trucks.

Guidance is fastened to the load-bearing part 4, on which the extensible body 8 is placed slidingly in the direction parallel to the wheel axis. The guidance is in the above described example of configuration comprised by two pipes 6 with axes parallel to the wheel axis.

Pipes 6 are fastened to the load-bearing part 4, and the outer pipes 5, which are attached to the extensible body 8, are slidingly placed on them.

Inside the pipes 6, tensile springs 7 are arranged between the load-bearing part 4 and the extensible body 8, and these springs draw the extensible body 8 to the load-bearing part 4.

In the extensible body 8, arms 9 are fulcrumed around axes parallel to the wheel axis, and the arms 9 are fitted with surfaces of engagement 10, which are basically perpendicular to the arms 9, on outer ends.

The device is fitted with drive, which is in this case pneumatic, for travel of the extensible body 8 and for turning of the arms 9. The drive includes source 13 of compressed air ordered on the load-bearing part 4. The source 13 of the compressed air is connected via control components 14 to the bellows 15 for extruding the extensible body 8 and to the pneumatic motors 16 for turning of arms 9 with surfaces of engagement 10. The control components 14 comprise electronically controlled regulation elements for remote control from the cab. Interconnection between the parts of the pneumatic circuit may be carried out by not depicted pressure hoses.

In an installed position, the device is attached to the wheel disc 3 by means of the load-bearing part 4, and the tensile springs 7 draw the extensible body 8 to the load-bearing part 4. The arms 9 with surfaces of engagement 10 are slightly turned to the home position, in which they do not protrude radially above the circumference of the extensible body 8.

When the anti-slip device needs to be set to the working position, i.e. to the state when the surfaces of engagement 10 bear against the tire peripheral surface 1, interconnection of the source of the compressed air 13 with the inner area of the bellows 15 takes place by means of an electric signal sent remotely from the vehicle cab to the respective control component 14.

By expanding the bellows 15, the extensible body 8 is extruded against the force of the tensile springs 7 outside from the wheel. By another electric signal received by the respective control component 14, interconnection between the source 13 of compressed air and pneumatic motors 16, which slightly turn the arms 9 with surfaces of engagement 10, is established. In this state, the compressed air is released from the bellows 15, and the tensile springs 7 draw the extensible body 8 to the load-bearing part 4. Within this movement, the surfaces of engagement 10 reach the position closely above the tire peripheral surface 1. The anti slip device is in the working position now. Fit of the surfaces of engagement 10 of arms 9 on the tire peripheral surface 1 during driving is enabled by the fact that the arms 9 are fulcrumed on the bearers 11, which are sprung and slidingly in the radial direction placed in the extensible body 8. Springing is ensured by springs 12.

After the anti slip device returns to the home position, firstly the extensible body 8 slides outward from the wheel by the way described above, and the surfaces of engagement 10 this way gets outside of contact with the tire peripheral surface 1. Based on the electric signal, the respective control component 14 in this position moves to a position, when the compressed air is released from the pneumatic motors 16 and is brought to their other areas, by which the arms 9 turn to the home position over the transmission. In this state, after releasing the compressed air from the bellows 15, the extensible body 8 slides back to the home position due to the effect of tensile springs 7.

There are four arms 9 in this configuration example. Their number may differ in accordance with spatial dimension.

The invention claimed is:

1. An anti slip device for an automobile wheel arranged about an axis, the wheel including a wheel disc (3) arranged at an inner side plane of the wheel and a tire (1) surrounding the wheel disc, the anti slip device comprising:
   a loading-bearing part (4) attachable to the wheel disc (3) from an exterior thereof;
   an extensible body (8) slidingly connected to the load-bearing part in a direction parallel to the axis of the wheel;
   a plurality of arms (9) extending directly from said extensible body, each of said arms extending radially outwardly from the axis of the wheel and terminating, at an end thereof distant from said extensible body, in a surface of engagement (10) lying parallel to the axis of the wheel,
   wherein, in a working position of said anti slip device, said surfaces of engagement of said plurality of arms engage a peripheral, road-engaging, surface of the tire (1),
   further including a guidance arrangement for connecting said extensible body (8) to said load-bearing part (4) and wherein the guidance arrangement comprises;
   at least two inner pipes (6) disposed parallel to the axis of the wheel; and
   at least two outer pipes (5), each of said outer pipes slidingly disposed about one of said at least two inner pipes and attached at one end thereof to the extensible body (8).

2. The anti slip device of claim 1, wherein each of said inner pipes has a tensile spring (7) arranged therein, each said tensile spring being attached at one end thereof directly to the load bearing part (4), and being attached, at an opposite end thereof, directly to the extensible body (8).

3. An anti slip device for an automobile wheel arranged about an axis, the wheel including a wheel disc (3) arranged at an inner side plane of the wheel and a tire (1) surrounding the wheel disc, the anti slip device comprising:
   a loading-bearing part (4) attachable to the wheel disc (3) from an exterior thereof;
   an extensible body (8) slidingly connected to the load-bearing part in a direction parallel to the axis of the wheel;
   a plurality of arms 9 extending directly from said extensible body, each of said arms extending radially outwardly from the axis of the wheel and terminating, at an end thereof distant from said extensible body, in a surface of engagement (10) lying parallel to the axis of the wheel,
   wherein, in a working position of said anti slip device, said surfaces of engagement of said plurality of arms engage a peripheral road-engaging, surface of the tire (1); and
   further including a driving assembly, said driving assembly adapted to shift a position of the extensible body (8) and to rotate arms (9);
   wherein said driving assembly comprises a pneumatic driving assembly, including a source (13) of compressed air, bellows (15) for shifting of the extensible body (8), pneumatic motors (16) for turning of arms (9), and control components (14).

4. The anti slip device of claim 3, wherein said control components (14) are fitted with remotely electrically controlled regulation elements.

5. The anti slip device of claim 1, wherein:
   said extensible body (8) includes a plurality of bearers (11), each of said plurality of bearers including a radially extending bore; and
   one of said plurality of arms (9) is slidingly disposed in a radially extending bore of one of the bearers (11).

6. An anti slip device for an automobile wheel arranged about an axis, the wheel including a wheel disc (3) arranged at an inner side plane of the wheel and a tire (1) surrounding the wheel disc, the anti slip device comprising:
   a loading-bearing part (4) attachable to the wheel disc (3) from an exterior thereof;
   an extensible body (8) slidingly connected to the load-bearing part in a direction parallel to the axis of the wheel;
   a plurality of arms 9 extending directly from said extensible body, each of said arms extending radially outwardly from the axis of the wheel and terminating, at an end thereof distant from said extensible body, in a surface of engagement (10) lying parallel to the axis of the wheel, wherein, in a working position of said anti slip device, said surfaces of engagement of said plurality of arms engage a peripheral, road-engaging, surface of the tire (1), wherein each of said arms includes a flat portion extending radially outwardly from the axis of the wheel, and wherein, in said working position of said anti slip device, an inner surface of said flat portion engages a side surface of the tire.

7. The anti slip device of claim 1, wherein in a second position of said anti slip device, said arms are drawn radially inward toward said extensible body, such that said surfaces of engagement of said plurality of arms are disposed radially inwardly from said peripheral, road-engaging, surface of said tire.

8. The anti slip device of claim 7, wherein in said second position said extensible body, said arms, and said surfaces of engagement are disposed axially exteriorly to said tire.

* * * * *